United States Patent [19]

Horiguchi

[11] Patent Number: 5,442,613
[45] Date of Patent: Aug. 15, 1995

[54] OPTICAL INFORMATION RECORDING/REPRODUCTION APPARATUS TO STOP RECORDING OPERATION UPON DETECTING ERROR IN ACCESS OPERATION TO TARGET TRACK

[75] Inventor: Toshio Horiguchi, Hachioji, Japan

[73] Assignee: Olympus Optical Co., Ltd., Tokyo, Japan

[21] Appl. No.: 180,465

[22] Filed: Jan. 12, 1994

Related U.S. Application Data

[63] Continuation of Ser. No. 827,390, Jan. 29, 1992, abandoned.

[30] Foreign Application Priority Data

Jan. 30, 1991 [JP] Japan ............... 3-009804

[51] Int. Cl.6 ............................................. G11B 7/09
[52] U.S. Cl. ........................................ 369/54; 369/58; 369/44.32
[58] Field of Search ............ 369/44.32, 44.33, 32, 369/53, 54, 58

[56] References Cited

U.S. PATENT DOCUMENTS

| 4,519,056 | 5/1985 | Kimoto et al. | 369/44.33 X |
| 4,759,006 | 7/1988 | Koishi et al. | 369/44.33 |
| 4,884,259 | 11/1989 | Horikawa et al. | 369/32 |
| 4,901,298 | 2/1990 | Masaki | 369/44.28 X |
| 4,984,230 | 1/1991 | Satoh et al. | 369/54 |
| 5,012,461 | 4/1991 | Yoshida et al. | 369/44.33 |
| 5,018,124 | 5/1991 | Ogasawara et al. | 369/44.33 |
| 5,099,464 | 3/1992 | Maeda | 369/44.33 |

FOREIGN PATENT DOCUMENTS

| 63-37876 | 2/1988 | Japan . |
| 63-193331 | 8/1988 | Japan . |
| 1-201831 | 8/1989 | Japan . |
| 2-43256 | 2/1990 | Japan . |
| 2-235220 | 9/1990 | Japan . |
| 3-100972 | 4/1991 | Japan . |
| 3-147573 | 6/1991 | Japan . |

*Primary Examiner*—Aristotelis Psitos
*Assistant Examiner*—Duncan Wilkinson
*Attorney, Agent, or Firm*—Armstrong, Westerman, Hattori, McLeland & Naughton

[57] ABSTRACT

In an optical information recording/reproducing apparatus to stop recording operation upon detecting an error in access operation to a target track, when making the access operation to the target track, if an abnormality is detected in the target track or some track in the neighborhood of the target track during a period of time from an access to the track in the neighborhood of the target track until reaching the target track, information is not recorded on the target track and the occurrence of an abnormality is informed to a host computer.

21 Claims, 3 Drawing Sheets

OPTICAL INFORMATION RECORDING/REPRODUCTION APPARATUS TO STOP RECORDING OPERATION UPON DETECTING ERROR IN ACCESS OPERATION TO TARGET TRACK

This application is a Rule 62 continuation of application Ser. No. 07/827,390 filed Jan. 29, 1992, now abandoned.

BACKGROUND OF THE INVENTION

1. Field of the Invention

The present invention relates to an improvement in an optical information recording/reproducing apparatus which records/reproduces information on a recording medium and stops recording operation upon detecting an error in access operation to a target track.

2. Related Art and Prior Art Statement

Recently, with development of the information industry, attention has been focused on optical information recording/reproducing apparatus as memory devices of large capacity. Known one of these optical information recording/reproducing apparatus is an optical card device for recording and/or reproducing information by using an optical card as a recording medium. The optical card is not rewritable like an optical disk, but has a storage capacity on the order of 1 to 2 Mbytes several thousands to ten thousands time as much as that of a magnetic card. Therefore, the optical card is expected to have a wide range of applications such as banknotes, portable maps or prepaid cards for use in shopping and so on. Because of non-rewritable nature, other applications in which data should be tamper-evident, such as personal health care cards, are also expected. There have further been proposed a variety of optical information recording/reproducing apparatus adapted to record/reproduce by using optical disks in the form of a circular sheet as recording media.

Optical cards as recording media are grouped into, for example, the type that ID sections having track address information recorded therein are provided in both end portions of tracks parallel to one another (see Japanese Patent Laid-Open No. 63-37876), and the type that a data section of each track is divided into a plurality of sectors which are headed by a sector mark including no address information and comprising particular patterns (see Japanese Patent Laid-Open No. 63-193331).

In optical card devices for recording/reproducing data on and from such optical cards, the optical card is generally moved in a direction parallel to tracks to thereby read the ID section or the sector mark and record/reproduce data. When making an access to the target track in this type optical card device, a mechanism such as VCM for linearly moving the whole of an optical head including an object lens is used to move the object lens in the direction perpendicular to tracks in combination of a coarse seek (coarse access) in which the position of the entire optical head in the moving direction is detected and positioned by position detecting means such as a linear scale, and a track jump in which the object lens is moved on a track pitch by track pitch basis by tracking drive means. The coarse access giving rise to movement of the entire optical head is carried out in such a manner that an optical beam is positioned with some extent of an error (variation) relative to the target track after movement of the optical head, due to an offset of the object lens from a base position caused at starting and stopping of the movement, i.e., positioning errors such as caused by vibrations of optical cards as well as tolerances of the linear moving mechanism and the position detecting means. That error is usually within 10 tracks. In order to correct the error resulted from the coarse seek so that the optical beam is moved to the target track, the track jump capable of precise movement must be performed in the number of times corresponding to the difference from the target track.

Figure 1:
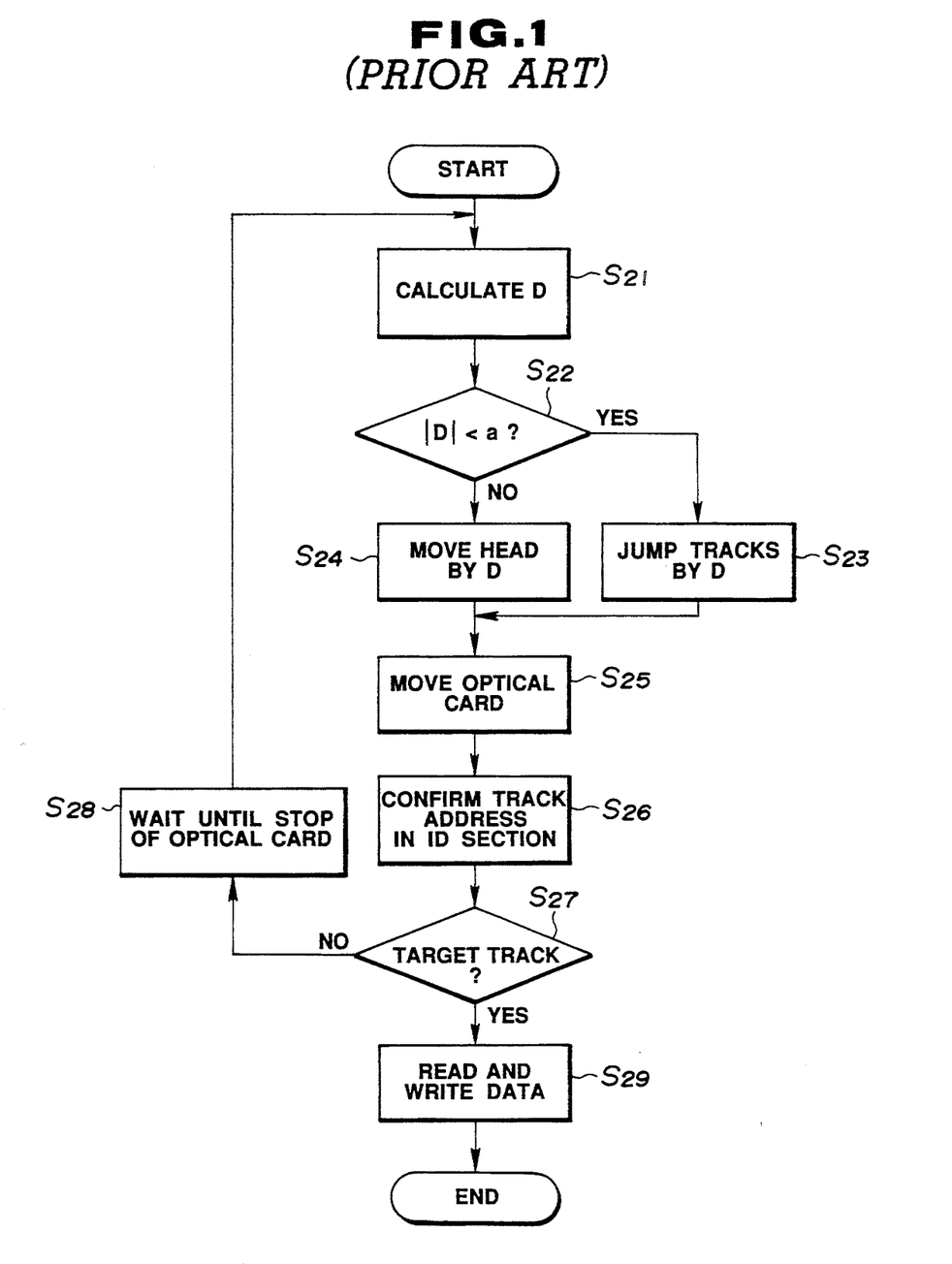
FIG. 1 is a flowchart showing operation of an optical information recording/reproducing apparatus of the related art.

The procedure of accessing to a target track on an optical card 30 shown in FIG. 3 will be described below with reference to a flowchart of the related art shown in FIG. 1.

Figure 3:
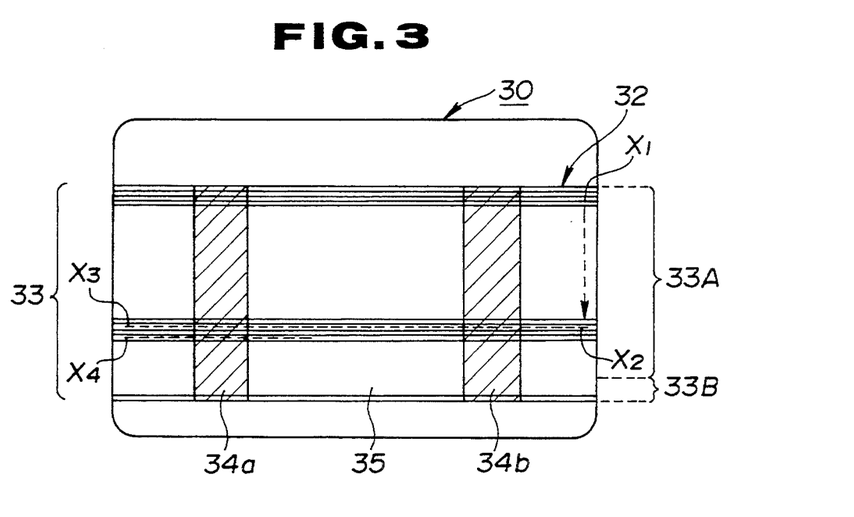
FIG. 3 is an explanatory view showing an arrangement of an optical card.

The optical card 30 shown in FIG. 3 includes an information recording section 33 having a plurality of tacks 32 parallel to one another, ID sections 34a, 34b provided at both ends of the information recording section 33 to record therein address information corresponding to the respective tracks, and a data section 35 provided between the ID sections 34a, 34b for enabling the writing of information therein.

Let it be now assumed that the optical card 30 shown in FIG. 3 is stopped, an optical spot used for recording/reproducing is positioned at X1 in FIG. 3, and the track address of the position X1 is known. First, a step S21 in FIG. 1 calculates the track difference D between the address of the target track and the address of the current track (onto which the light spot is being illuminated). Then, a step S22 in FIG. 1 determines whether or not an absolute value $|D|$ is smaller than a certain setting value a. If the decision is Yes ($|D|<a$), then the control flow goes to a step S23 in FIG. 1 where the track jump is made by a distance corresponding to the track difference D, because moving the object lens by repeating the track jump needs a shorter access time than the coarse access of moving the entire optical head. Note that the setting value a is usually selected to be on the order of 4 to 10. On the other hand, if the decision in the step S22 is No ($|D|>a$), then the coarse seek is performed to move the optical head by a distance corresponding to the track difference D in a step S23 of FIG. 1. The position of the light spot after the above movement by the coarse seek is indicated by reference character X2 shown in FIG. 3. Thereafter, while moving the optical card 30 in the direction of tracks in a step S25 of FIG. 1, the track address recorded in the ID section 34b is read out in a step S26 of FIG. 1 to confirm the track address after the movement by the coarse seek. Next, in a step S27 of FIG. 1, whether the target track is reached or not is determined from the track address read out of the ID section 34b. Here, when the optical head has been moved by the track jump in the step S23 of FIG. 1, the target track is reached in most cases because of high accuracy of the track jump operation, but when it has been moved by the coarse seek, the target track is rarely reached for the reasons mentioned above. If the decision in the step S27 is No, then a step S27 in FIG. 1 waits a predetermined period of time for that the optical card 30 is moved to the opposite end for positioning the light spot at X3 in FIG. 3 and stopped, followed by returning to the step S21 in FIG. 1 after the predetermined period of time. The difference between the position X3 and the target track usually holds the relationship of $|D|<a$ and, therefore, the light spot is now positioned to X4 in FIG. 3 by making the track jump by a distance corresponding to the track difference D. If the decision in the step S27 is Yes, then read/write operation of data is performed in a step S29 of FIG. 1 because the address is in match with the target track.

Meanwhile, as related art Japanese Patent Laid-Open No. 03-100972 and No. 03-147573 disclose means for improving reliability of recorded data when data is recorded on an optical card. In Japanese Patent Laid-Open No. 03-100972, the detection criterion for a synch signal contained in track address information preformatted on an optical card is made severer during the recording of data than during the reproduction of data and the seek to a target track, thereby preventing data from being recorded on those tracks of which address information is hard to read. Accordingly, even with deterioration occurred over time, data can be recorded on tracks under good condition. In Japanese Patent Laid-Open No. 03-147573, the error detecting and correcting capability for track address information preformatted on an optical card is made lower during the recording of data than during the reproduction of data and the seek to a target track, thereby preventing data from being recorded on those tracks of which address information is hard to read. Stated otherwise, a possible risk that the address cannot be properly read at the present or in future is checked beforehand to disable the writing of data on those tracks having such a risk.

However, when an optical head is moved toward a target track on an optical card and once landed on some track near the target track, an error such as a track-/focus offset may occur due to a defect, dust or the like on the track other than the target track. Further, when repeating the track jump from some track near the target track to the target track, a track servo system is once turned off and pluses are applied to an object lens actuator to move an object lens by one track. Then, after vibrations of the object lens are settled to a satisfactory extent, the track servo system is turned on again. In this connection, if a defect, dust or the like on the optical card is present at a position where the track servo system is turned on, the positioning of a light spot over tracks may be failed such that the light spot lands on other track apart from the one intended by the track jump, or in the worst case, a focus servo system may come out of the coverage. Such an event appears more significantly when the track jump is made through the so-called double servo mode. Further, when repeating the track jump plural times, a risk of abnormal track jump is enlarged as the number of repeated times increases.

In the event of such a drawback, prior art apparatus have taken the following measures to cope with it. The optical head is once returned to the home position set by the linear scale, for example, to recognize the track address at which the light spot is positioned at the present, followed by trying movement operation to the target track a predetermined number of times. If the retry operation has succeeded in making the light spot reach the target track within the predetermined number of times, recording/reproducing operation is carried out without judging such a condition as a significant error. This type technique is described, by way of example, in Japanese Patent Laid-Open No. 2-235200.

The above retry operation is very effective in reading data on the optical card, but produces a contrary effect when recording data on the optical card. Specifically, if the size of a defect, dust or the like is on the borderline whether to cause a track offset or not, it may happen that a seek was succeeded accidentally at the time of recording data, but an access fails to succeed during the subsequent reading of data. This results in a serious trouble that the recorded data cannot be accessed.

Additionally, in the above-cited Japanese Patent Laid-Open No. 03-100972 and No. 03-147573, when the preformatted track address or synch pattern is hard to read during the recording, data is prevented from being recorded on the relevant track. However, no explanations are found about a track offset and the above-stated disadvantage is thought to inevitably occur in those references.

OBJECT AND SUMMARY OF THE INVENTION

An object of the present invention is to provide an optical information recording/reproducing apparatus to stop recording operation upon detecting an error in access operation to a target track, by which when a trouble due to a defect, dust or the like is detected on or near a target track, data can be prevented from being recorded on the track on which the trouble has been detected, to avoid the disablement of reading of the recorded data.

Another object of the present invention is to provide an optical information recording/reproducing apparatus to stop recording operation upon detecting an error in access operation to a target track, by which even when a trouble due to a defect, dust or the like is detected on or near a target track, data can be stably recorded with high reliability.

Still another object of the present invention is to provide an optical information recording/reproducing apparatus to stop recording operation upon detecting an error in access operation to a target track, by which even in the case of a recording medium that a trouble due to a defect, dust or the like is detected on or near a target track, the position of such a trouble on the recording medium can be recognized to stably record data with high reliability.

In summary, the present invention: provides an optical information recording/reproducing apparatus to stop recording operation upon detecting an error in access operation to a target track, in which a recording medium and an optical head are relatively moved to perform at least one of recording and reproducing of information, the apparatus being featured in that when making the access operation to the target track, if an abnormality is detected in the access operation to the target track during a period of time from an access to some track in the neighborhood of the target track until reaching the target track, information is not recorded on the target track or on the track in the neighborhood of the target track.

Other features and advantages of the present invention will be fully apparent from the following detailed description.

DETAILED DESCRIPTION OF THE PREFERRED EMBODIMENTS

As shown in FIG. 3, an optical card 30 as a recording medium has a record area 33 in which a track 32 is formed to extend in the direction of long side of the card and plural in number side by side in the direction of width (short side) of the card. The record area 33 is divided in the direction of short side of the optical card 30 into an information recording area 33A in which information is to be written, and an alternate area 33B in which when a track is found to be incapable of writing information thereon, information such as address of the failed track is to be written. The record area 33 also includes ID sections 34a, 34b provided in both end portions of the optical card near the opposite short sides for recording information indicative of addresses corresponding to the respective tracks in such a manner as able to read the information in opposite directions. Accordingly, when the optical card 30 is moved in the direction of tracks from the left to the right in the drawing with respect to an optical head (described later), for example, the ID section 34a is read to enable the recognition of the address information corresponding to the track. Also, when the optical card 30 is moved in the direction of tracks from the right to the left in the drawing with respect to an optical head, the ID section 34b is read to enable the recognition of the address information corresponding to the track. Note that for the purposes of preventing influences of damages, smudges or the like at card edges and sufficiently stabilizing a relative speed in the direction of tracks between the optical card 30 and the optical head, the ID sections 34a, 34b are disposed inwardly of the card edges by a certain distance (e.g., 4 mm). Further, the ID sections 34a, 34b are preformatted when the optical card is manufactured.

Figure 2:
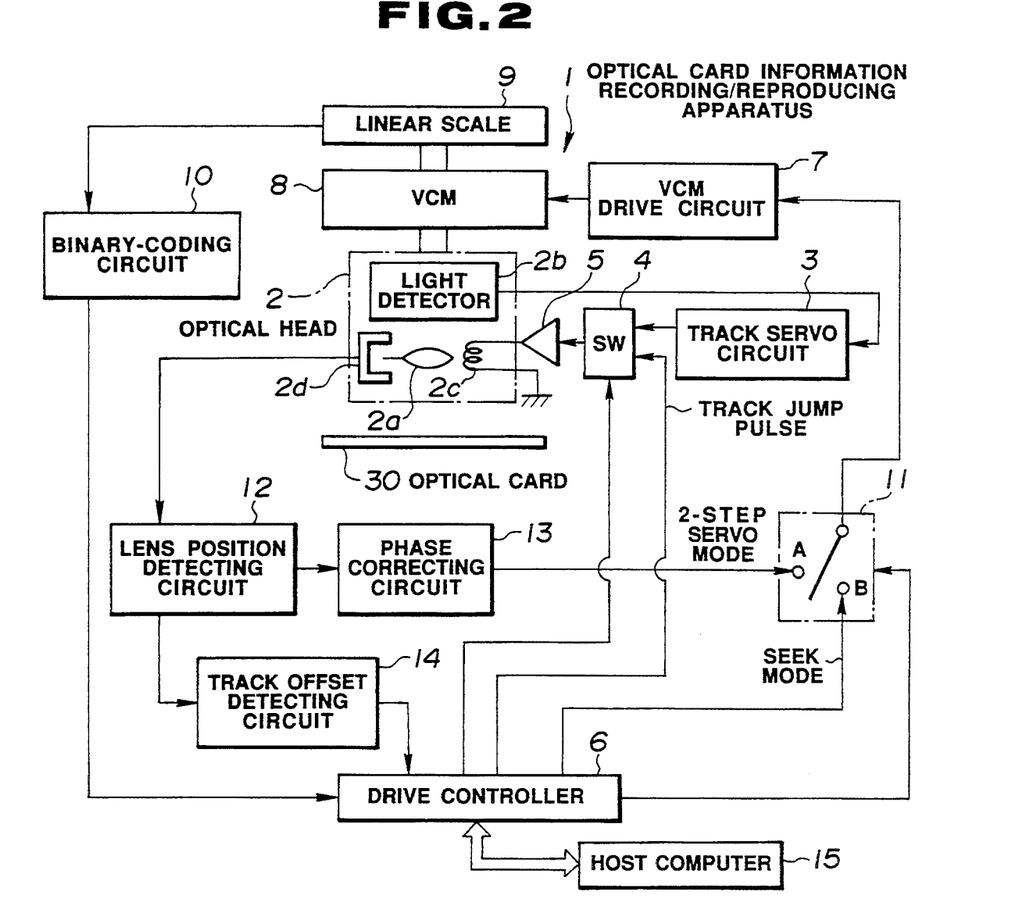
FIG. 2 is a block diagram of an optical information recording/reproducing apparatus of the present invention.

As shown in FIG. 2, an optical card information recording/reproducing apparatus 1 as one of the present optical information recording/reproducing apparatus has an optical head 2 for irradiating a spot of recording/reproducing light from the optical card 30. The optical head 2 is arranged to project the light spot onto the optical card 30 via an optical system (not shown) comprising a light source, an object lens 2a, etc. A light detector (photosensor) 2b of the optical head 2 converts the reflected light from the optical card 30 into an electric signal, followed by outputting an information reproducing signal to a demodulation circuit (not shown) and a tracking error signal (TES) to a track servo circuit 3, respectively. In response to the TES, the track servo circuit 3 drives a tracking actuator 2c of the optical head 2 via a switch (SW) 4 and an amplifier 5 to make control so that the light spot from the object lens 2a follows the track 32. When carrying out a track jump, a drive controller 6 for controlling the entire apparatus instructs change-over of the switch 4 and also outputs a track jump pulse to the switch 4 to drive the tracking actuator 2c via the amplifier 5, thereby instructing the object lens 2a to perform a track jump (fine access). Additionally, the optical card information recording/reproducing apparatus 1 is arranged such that the apparatus 1 itself is controlled and managed under supervision of a host computer 15 externally provided as an higher-order controller.

The light detector 2b of the optical head 2 further outputs a focus error signal and supplies it to a focus servo circuit and a focus offset detecting circuit (both not shown). In response to the focus error signal amplified by an amplifier (not shown), the focus servo circuit drives and controls a focusing actuator (not shown) so that the light spot of the optical head 2 is always in an in-focus state on the optical card 30. The focus offset detecting circuit detects a focus offset in accordance with a later-described method and informs the drive controller 6 of an abnormal condition.

Outputs of the amplifier 5 for the track servo control and the amplifier for the focus servo control are applied to respective drive current detecting circuits (not shown) each of which informs the drive controller 6 of an abnormal condition when the associated drive current is in excess of a predetermined value.

Further, the optical head 2 can be moved in the direction traversing the track 32 on the optical card 30 (i.e., the seeking direction) by a VCM 8 which is driven under control of a VCM drive circuit 7. A linear scale 9 detects an amount of movement in the seeking direction and outputs it to a binary-coding circuit 10. The binary-coding circuit 10 converts the amount of movement into a binary value and outputs it to the drive controller 6. When carrying out coarse seek (coarse access) operation, the drive controller 6 applies a seek control amount to the VCM control circuit 7 via a shift switch 11 so that the optical head 2 is moved to the target track through the coarse seek.

The optical head 2 has a lens position detector 2d built therein for outputting a signal indicative of a position offset of the object lens 2a. The optical card information recording/reproducing apparatus 1 further includes a lens position detecting circuit 12 for detecting a position of the object lens 2a from the output of the lens position detector 2d, a phase compensating circuit 13 to compensate the phase of a signal outputted from the lens position detecting circuit 12 in the case of a 2-step servo mode, and a track offset detecting circuit 14 for, in response to the signal outputted from the lens position detecting circuit 12, detecting a track offset of the light spot and outputting a detected signal to the drive controller 6. When carrying out the 2-step servo mode, the drive controller 6 outputs a lens position signal to the VCM drive circuit 7 via the lens position detector 2d, the lens position detecting circuit 12, the phase compensating circuit 13 and the shift switch 11, whereupon the VCM drive circuit 7 drives the VCM 8 to make control so that the object lens 2a is kept at a base position (i.e., a central position) in the optical head 2.

In the optical card information recording/reproducing apparatus 1, the optical head 2 is arranged opposite to the optical card 30 placed on a frame (not shown), and the optical card 30 is transported in the direction of tracks by an optical card transporting mechanism for the purpose of tracking.

The procedure by which the optical card information recording/reproducing apparatus 1 makes an access to a target track on the optical card 30 shown in FIG. 3 will be described below with reference to a flowchart shown in FIG. 4.

Let it be now assumed that the optical card 30 shown in FIG. 3 is stopped, an optical spot used for recording/reproducing is positioned at X1 in FIG. 3, and the track address of the position X1 is known. First, a step S1 in FIG. 4 calculates the track difference D between the address of the target track and the address of the current track (onto which the light spot is being illuminated). Then, a step S2 in FIG. 4 determines whether or not an absolute value |D| is smaller than a certain setting value a. Note that the setting value a is usually selected to be on the order of 4 to 10. If the decision is No (|D|>a), then the control flow goes to a step S3 in FIG. 4 where the drive controller 6 instructs the shift switch 11 to be changed over to the B side shown in FIG. 2 and also outputs an amount of movement (distance) corresponding to the track difference D to the VCM drive circuit 7 via the switch 11, thereby moving the optical head 2 to carry out a coarse access. On the other hand, if the decision in the step S2 is Yes (|D|<a), then the control flow goes to a step S4 in FIG. 4 where the drive controller 6 instructs the shift switch 11 to be changed over to the opposite side and also drives the tracking actuator 2c via the switch 4 and the amplifier 5, causing the object lens 2a to make a track jump by a distance corresponding to the track difference D, because moving the object lens 2a by repeating the track jump needs a shorter access time than the coarse access of moving the entire optical head. At this time, the apparatus 1 carries out the 2-step servo mode with the shift switch 11 changed over to the A side.

Figure 4:
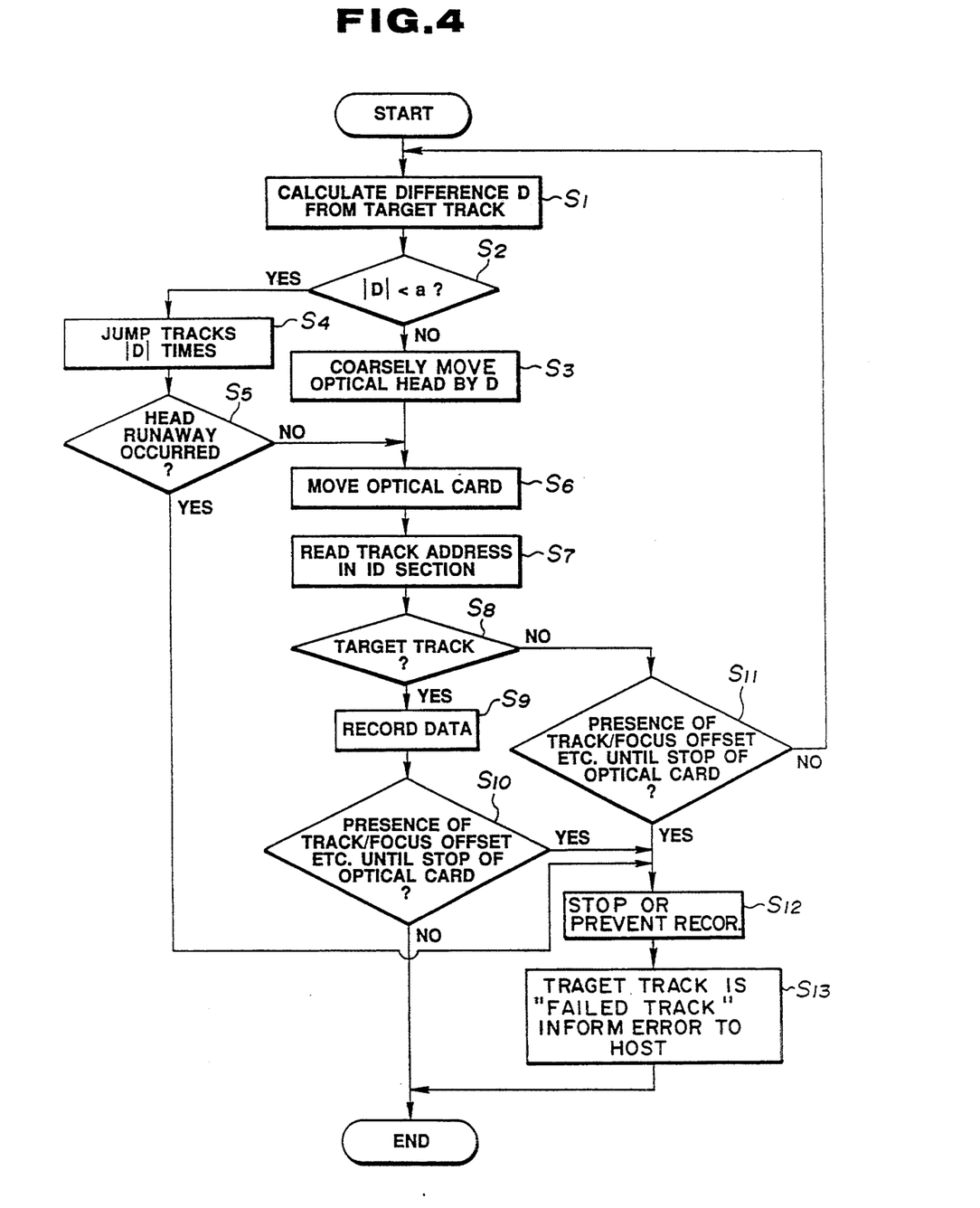
FIG. 4 is a flowchart showing operation of the optical information recording/reproducing apparatus.

Next, whether or not the optical head 2 undergoes runaway is determined in a step S5 of FIG. 4. The 2-step servo system of the optical card information recording-/reproducing apparatus 1 has no gain at high frequency not less than 100 Hz. Therefore, to perform the track jump operation at a high speed, the shift switch 11 remains changed over to the A side even during the track jump operation. Here, the 2-step servo system implies a loop including the lens position detector 2d, the lens position detecting circuit 12, the phase compensating circuit 13, the switch 11, the VCM drive circuit 7 and the VCM 8.

Accordingly, in the present apparatus 1, if the object lens 2a fails to land on the intended track due to a defect, dust or the like on the optical card 30 when the track jump operation is performed with the 2-step servo system kept closed, the object lens 2a cannot be positioned and the output of the lens position detector 2d is disturbed. Then, as a result of that the whole of the optical head 2 attempts to follow the output of the lens position detector 2d through the 2-step servo system, the optical head 2 starts run away. This runaway condition is detected as follows. Because the optical card 30 remains stationary with respect to the optical head 2 during the track jump operation, the optical head 2 under the 2-step servo mode is moved by one track pitch (e.g., 12 μm) following the track jump of one track. On the other hand, by setting accuracy of the linear scale 9 comparable to or finer than the track pitch, the position of the VCM 8, i.e., the position of the optical head 2, can be detected precisely. Consequently, while monitoring the signal outputted from the linear scale 9 via the binary-coding circuit 10, the drive controller 6 can recognize runaway of the optical head 2 when the monitored value is in excess of a predetermined value (e.g., corresponding to 5 tracks=60 μm).

If the optical head 2 is subjected to the coarse seek in the step S3 of FIG. 4, or if the optical head 2 causes no runaway after the track jump (i.e., the decision in the step S5 is No), then the control flow goes such that while moving the optical card 30 in the direction of tracks in a step S6 of FIG. 4, the track address recorded in the ID section 34b is read out in a next step S7 to confirm the track address after the movement by the coarse seek. Here, when the optical head 2 has been moved by the track jump in the step S4 of FIG. 4, the target track is reached in most cases, but when it has been moved by the coarse seek, the target track is rarely reached for the presence of errors. In a step S8 of FIG. 4, therefore, whether the target track is reached or not is determined from the track address read out of the ID section 34b. If the decision is Yes, then operation of recording data is performed in a step S9 of FIG. 4 because the address is in match with the target track. Subsequently, in a step S10 of FIG. 4, the drive controller 6 determines whether or not the track on which data is to be recorded is failed, i.e., whether or not a trouble such as a defect, dust or the like is present on the optical card 30, during a period until stop of the optical card 30 in accordance with the following three conditions:

(1) Using the method described in Japanese Patent Laid-Open No. 01-201831, the track offset detecting circuit 14 confirms the presence or absence of a track offset. If the presence or absence of a track offset is confirmed, then this is determined as the occurrence of a trouble;

(2) The presence or absence of a focus offset is also confirmed. Using the known technique, for example, a DC level of the reflected light from the optical card 30 is obtained from the focus error signal of the light detector 2b and compared with a comparator (not shown) to detect a focus offset when the DC level is not higher than a predetermined comparator level. If the focus offset is detected, then this is determined as the occurrence of a trouble; or (3) If the drive current of the focus actuator or the tracking actuator is not less than a predetermined value, then this is determined as the occurrence of a trouble.

These phenomena (1) to (3) appear when a defect, dust or the like is present on the optical card.

Note that the above decision relating to the presence of a trouble may be performed by the host computer 15 in place of the drive controller 6.

In this embodiment, the occurrence of any one of the above three conditions (1) to (3) results in the decision that a failure of the target track has occurred. If the decision in the step S10 of FIG. 4 is No, i.e., if the target track is normal, then the optical card 30 is stopped after completing predetermined recording operation.

On the other hand, if the decision in the step S8 of FIG. 4 is No (i.e., if the target track is not reached), then whether the current track reached is failed or not is determined in a step S11 of FIG. 4 following the above three conditions as with the step S10. If the decision is No (i.e., if not failed), then the control flow is returned to the step S1 for accessing to the target track again.

Note that the case where the decision in the step S8 is No may also include the case where the track address cannot be read.

A step S12 in FIG. 4 is performed when the step S5 determines runaway of the optical head 2 due to a failure of the track reached by the movement during the track jump operation, or when the step S10 confirms a failure in the target track during the recording of data, or when the step S11 confirms a failure during the movement toward the target track including those tracks in the neighborhood of the target track. Thus, the step S12 is the process executed when any of the above abnormal conditions has occurred. In the step S12, since the track reached after the movement is determined as failed in any case, the optical card information recording/reproducing apparatus 1 stops the present or future recording of data on the target track regardless of whether the track reached after the movement is the target track or not. Also, when the step S12 in FIG. 4 determines the focus offset, the recording is stopped or prevented similarly to the event of the track offset. However, since the recording operation itself is disabled in the event of the focus offset, it is not necessarily required to forcibly stop the recording operation. Next, in a step S13 of FIG. 4, the drive controller 6 informs the host computer of that the target track is "a failed track". The host computer 15 receives an error signal indicating a failure of the track, along with the track address of "the failed track", for storage of the information. This permits the address of the track determined as "a failed track" not to be selected in the subsequent writing/reading operation of data. Accordingly, the writing/reading of data will never be carried out on that track since then. The retry operation of attempting to write data again is also inhibited.

The host computer 15 which has recognized the failed track in the step S13 now changes the target track from the initial one to a different one and records the information not recorded in the previous try on the new track. The drive controller 6 once returns the optical head 2 to the home position (initial position of the movement) set by the linear scale 9 and recognizes the address of the track, on which the light spot is positioned through tracking servo control, from the information signal detected by the optical head 2. After that, the process beginning at the step S1 is executed again to make an access for writing data, while changing the target track.

If an error occurs once again after changing the target track, the operation of writing data while changing the target track will be retried until success of the writing.

In the case that data is completely written without causing an error, the address of the track on which the data has been written, as well as the address of the failed trace are written in the alternate area 33B. When the optical card is loaded into another apparatus, or when it is once taken out of the apparatus and then loaded into the same again, the alternate area 33B is first read to recognize the failed track, making it possible to prohibit an access to the failed track. Note that in a desire to stop the recording of data on neighbor tracks as well, the addresses of those neighbor tracks are also written in the alternate area 33B.

Although only the target track is informed as "a failed track" in the above step S13, if the accessed track is some track in the neighborhood of the target track, only that neighbor track may be informed as "a failed track".

Alternatively, the step S13 may determine all the neighbor tracks, including the target track, as "failed tracks" rather than only the target track. This is effective in improving reliability of the recorded data because the occurrence of "a failed track) implies high probability that a defect, dust or the like on the optical card, which is responsible for the failure, may be present over the target track and the neighbor tracks.

With this embodiment, when making the movement (access) toward the target track, the optical head 2 or the object lens 2a is moved by the coarse seek or the track jump while permitting the apparatus to find an abnormality at the target track, find an abnormality in some track near the target track, and further find an abnormality even in the movement from the neighbor track to the target track. In any case, regardless of whether or not the track reached after the movement is the target track, the writing of data can be stopped upon regarding the condition as a failure of the target track and, in addition, data can be prevented from being written on the failed track since then.

With this embodiment, also during the access to the target track for recording, an abnormality of the target track can be found, whereupon the writing of data can be stopped upon regarding the condition as a failure of the target track and, in addition, data can be prevented from being written on the failed track since then in a like manner.

Further, when only the neighbor track is determined as "failed track" or both the neighbor tracks and the target track are determined as "failed tracks" instead of determining only the target track as "a failed track" in the step S13, as stated above, the writing of data can be stopped upon regarding the condition as a failure of the track and, in addition, data can be prevented from being written on the failed track since then in a like manner.

As mentioned before, according to this embodiment, since data is kept from being written on a failed track or such a track that may become a failed track with high probability of risk, it is feasible to always write data only on those tracks having high reliability. Accordingly, as compared with the apparatus of carrying out the error process based only an abnormality on the target track, a trouble occurred on a track due to degradation of characteristics caused by a defect or dust on the optical card, a deterioration in the optical card over time, etc. can be found at an earlier time for positive protection. For example, it is possible to prevent such a serious trouble that data could be recorded accidentally at the time of recording data, but a track offset or a focus offset occurs during the subsequent reproduction, whereby the data cannot be reproduced even with the retry operation repeated.

Moreover, since the address of the failed track is written in the alternate area 33B, even when the optical card is loaded into another apparatus, this apparatus can recognize the address of the failed track, as well as the address of the track free from any fail on which information has been newly written.

While the optical card is used as a recording medium in the foregoing description of this embodiment, the present invention can also be applied to optical information recording/reproducing apparatus which records/reproduces information using optical disks.

It is apparent that the present invention can be practiced in a wide range of different embodiments on the basis of the spirit of the invention. The present invention is not restricted by particular embodiments thereof, but limited by only the attached claims.

What is claimed is:

1. A method for controlling an optical information recording/reproducing apparatus, comprising:
    performing an access operation to a target track prior to reaching said target track by moving relatively a recording medium and an optical head for irradiating a light spot onto said recording medium, and controlling said light spot to be focused on said recording medium; and
    stopping the access operation to said target track if an abnormality due to at least one of a defect in a track of said recording medium and an impurity on a track of said recording medium is detected in the access operation to said target track during a period of time prior to reaching said target track, and wherein when said abnormality is detected, said target track is labelled as a failed track and no further accessing to said target track occurs.

2. A method according to claim 1, further comprising:

accessing said target track if said abnormality is not detected in the access operation to said target track;

performing said at least one of recording and reproducing of information;

stopping the performance of said at least one of recording and reproducing of information if said abnormality is detected during the performance of said at least one of recording and reproducing of the information.

3. A method for controlling an optical information recording/reproducing apparatus, comprising:

performing an access operation to a target track prior to reaching said target track by moving relatively a recording medium and an optical head for irradiating a light spot onto said recording medium, and controlling said light spot to be focused on said recording medium; and stopping the access operation to said target track if an abnormality due to at least one of a defect in a track of said recording medium and an impurity on a track of said recording medium is detected in the access operation to said target track during a period of time from an access to a neighbor track within a predetermined number of tracks of said target track prior to reaching said target track, and Wherein when said abnormality is detected, said target track is labelled as a failed track and no further accessing to said target track occurs.

4. A method according to claim 3, wherein when performing the access operation to said target track, if said abnormality is detected in the access operation to said target track during a period of time from an access to said neighbor track within a predetermined number of tracks of said target track until reaching said target track, information is not recorded on said neighbor track.

5. A method according to claim 3, wherein when performing the access operation to said target track, if said abnormality is detected in the access operation to said target track during a period of time from an access to said neighbor track within a predetermined number of tracks of said target track until reaching said target track, information is not recorded on said target track and said neighbor track.

6. A method according to claim 3, wherein when performing the access operation to said target track, if said abnormality is detected in the access operation to said target track during a period of time from an access to said neighbor track within a predetermined number of tracks of said target track until reaching said target track, after moving to a second neighbor track different from said neighbor track and within a predetermined number of tracks of said target track, information is not recorded on said target track.

7. A method according to claim 3, wherein when performing the access operation to said target track, if said abnormality is detected in the access operation to said target track during a period of time from an access to said neighbor track within a predetermined number of tracks of said target track until reaching said target track, after moving to a second neighbor track different from said neighbor track and within a predetermined number of tracks of said target track, information is not recorded on said second neighbor track different from said neighbor track.

8. A method according to claim 3, wherein when performing the access operation to said target track, if said abnormality is detected in the access operation to said target track during a period of time from an access to said neighbor track within a predetermined number of tracks of said target track until reaching said target track, after moving to a second neighbor track different from said neighbor track and within a predetermined number of tracks of said target track, information is not recorded on said target track and said second neighbor track different from said neighbor track.

9. A method according to claim 3, wherein when performing the access operation to said target track, if said abnormality is detected in operation of reading an address of said neighbor track or an address of said target track, information is not recorded on said target track.

10. A method according to claim 3, wherein when performing the access operation to said target track, if said abnormality is detected in operation of reading an address of said neighbor track, information is not recorded on said neighbor track.

11. A method according to claim 3, wherein when performing the access operation to said target track, if said abnormality is detected in operation of reading an address of said accessed neighbor track or an address of said target track, information is not recorded on said target track and said neighbor track.

12. A method according to claim 3, further comprising:

accessing said target track if said abnormality is not detected in the access operation to said target track;

performing said at least one of recording and reproducing of information;

stopping the performance of said at least one of recording and reproducing of information if said abnormality is detected during the performance of said at least one of recording and reproducing of the information.

13. A method for controlling an optical information recording/reproducing apparatus, comprising:

performing an access operation to a target track prior to reaching said target track by moving relatively a recording medium and optical head for irradiating a light spot onto said recording medium, and controlling said light spot to be focused on said recording medium; and stopping the access operation to said target track, by setting as a condition for detecting an abnormality the occurrence of one or more of an abnormality in movement control of a light spot, an abnormality in focus control of said light spot, an abnormality in drive current used in the movement control or the focus control of said light spot, and runaway of said light spot, if one or more of said abnormalities is detected during a period of time from an access to a neighbor track within a predetermined number of tracks of said target track prior to reaching said target track, and wherein when said abnormality is detected, said target track is labelled as a failed track and no further accessing to said target track occurs.

14. A method according to claim 3, wherein if one or more of said abnormalities is detected, information is not recorded on said neighbor track.

15. A method according to claim 13, wherein if one or more of said abnormalities is detected, information is not recorded on said target track and said neighbor track.

16. A method according to any one of claims 13, 14, or 15, wherein:
said optical information recording/reproducing apparatus is connected to a higher-order controller for transmitting and receiving information to and from said higher-order controller, and
if one or more of said abnormalities is detected, information is not recorded on said track and the occurrence of one or more of said abnormalities is communicated to said higher-order controller.

17. A method according to claim 16, wherein if one or more of said abnormalities is detected, information is not recorded on said track and the address of said track on which said one or more abnormalities has occurred is recorded in a predetermined area of said recording medium.

18. A method according to claim 17, wherein if one or more of said abnormalities is detected, information is not recorded on said track, the address of said track on which said one or more abnormalities has occurred is recorded in a predetermined area of said recording medium, information is recorded on a track other than said track on which said one or more abnormalities has occurred, and the address of said track on which said information has been recorded is recorded in the predetermined area of said recording medium.

19. A method according to claim 18, wherein if said one or more abnormalities is an abnormality in the focus control of said light spot, stopping the recording of information on said track is not performed.

20. A method according to claim 13, further comprising:
accessing said target track if said abnormality is not detected in the access operation to said target track;
performing said at least one of recording and reproducing of information;
stopping the performance of said at least one of recording and reproducing of information if said abnormality is detected during the performance of said at least one of recording and reproducing of the information.

21. A method according to any one of claims 1,3,4,5,6,7,8,9,10,11,13,14,15,16,17,18 or 19 wherein said recording medium is a card-shaped medium.

* * * * *